(12) United States Patent
Giaccari et al.

(10) Patent No.: US 8,477,314 B2
(45) Date of Patent: Jul. 2, 2013

(54) REFERENCING OF THE BEATING SPECTRA OF FREQUENCY COMBS

(75) Inventors: Philippe Giaccari, Zurich (CH); Jerome Genest, Quebec (CA); Pierre Tremblay, L'ancienne-lorette (CA); Philippe Saucier, Quebec (CA); Jean-Daniel Deschênes, Québec (CA)

(73) Assignee: Université Laval, Quebec (CA)

( * ) Notice: Subject to any disclaimer, the term of this patent is extended or adjusted under 35 U.S.C. 154(b) by 505 days.

(21) Appl. No.: 12/664,887

(22) PCT Filed: Jun. 26, 2008

(86) PCT No.: PCT/CA2008/001198
§ 371 (c)(1),
(2), (4) Date: May 28, 2010

(87) PCT Pub. No.: WO2009/000079
PCT Pub. Date: Dec. 31, 2008

(65) Prior Publication Data
US 2011/0043815 A1 Feb. 24, 2011

Related U.S. Application Data

(60) Provisional application No. 60/946,239, filed on Jun. 26, 2007.

(51) Int. Cl.
*G01B 9/02* (2006.01)
(52) U.S. Cl.
USPC .......................................................... 356/451
(58) Field of Classification Search
USPC .......................................................... 356/451
See application file for complete search history.

(56) References Cited

U.S. PATENT DOCUMENTS

| | | | |
|---|---|---|---|
| 5,293,213 A | 3/1994 | Klein et al. | |
| 5,748,309 A * | 5/1998 | van der Weide et al. | 356/326 |
| 5,778,016 A | 7/1998 | Sucha et al. | |
| 6,724,788 B1 | 4/2004 | Holzwarth et al. | |
| 7,075,957 B2 | 7/2006 | Kallmann et al. | |
| 2006/0251424 A1 | 11/2006 | Nicholson et al. | |
| 2007/0182966 A1* | 8/2007 | Sanders et al. | 356/484 |

FOREIGN PATENT DOCUMENTS

| | | |
|---|---|---|
| WO | 2006008135 A2 | 1/2006 |
| WO | 2007045461 A1 | 4/2007 |

OTHER PUBLICATIONS

Keilmann F. et al., 2004, "Time-domain mid-infrared frequency-comb spectrometer.", Optics Letters, vol. 29, No. 13, pp. 1542-1544.
Udem Th. et al., 2002, "Optical frequency metrology.", Nature, vol. 416, pp. 233-237.
Schliesser A. et al., 2005, "Frequency-comb infrared spectrometer for rapid, remote chemical sensing.", Optics Express, vol. 13, No. 22, pp. 9029-9038.

(Continued)

*Primary Examiner* — Tari Fur Chowdhury
*Assistant Examiner* — Jonathon Cook
(74) *Attorney, Agent, or Firm* — McCracken & Frank LLC

(57) ABSTRACT

There is provided a method for referencing and correcting the beating spectrum generated by the interference of the components of a frequency comb source. The proposed method allows monitoring of variations of a mapping between the source and the beating replica. This can then be used to compensate small variations of the source in Fourier transform spectroscopy or in any other interferometry application in order to overcome the accuracy and measurement time limitations of the prior art. Constraints on source stability are consequently reduced.

27 Claims, 12 Drawing Sheets

OTHER PUBLICATIONS

Schiller S., 2002, "Spectrometry with frequency combs.", Optics Letters, vol. 27, No. 9, pp. 766-768.

Eckstein J. N. et al., 1978, "High-Resolution Two-Photon Spectroscopy with Picosecond Light Pulses.", Physical Review Letters, The American Physical Society, vol. 40, No. 13, pp. 847-850.

Newbury N. R. et al., 2007, "Lidar with Femtosecond Fiber-Laser Frequency Combs.", Coherent Laser Radar Conference, Snowmass, Colorado.

I Coddington, W.C. Newbury, and N.R. Newbury, "Coherent multiheterodyne spectroscopy using stabilized optical frequency combs," Physical Review Letters 100, 013902 (2008).

D.R. Jones, S.A. Diddams, J.K. Randa, A. Stentz, R.S. Windeler, J.L. Hall, and S.T. Cundiff, "Carrier-Envelope Phase Control of Femtosecond Mode-Locked Lasers and Direct Optical Frequency Synthesis," Science, vol. 288, pp. 635-639 (2000).

\* cited by examiner

REFERENCING OF THE BEATING SPECTRA OF FREQUENCY COMBS

CROSS-REFERENCE TO RELATED APPLICATIONS

The present application claims priority of PCT patent application no. PCT/CA2008/001198, filed on Jun. 26, 2008, which claims priority of U.S. provisional patent application No. 60/946,239, filed on Jun. 26, 2007.

TECHNICAL FIELD

The present invention relates to the referencing of frequency comb sources. More specifically, the present invention relates to the referencing of the beating spectrum generated by the interference of one or several frequency comb sources.

BACKGROUND

Spectroscopy uses the interaction of a radiation with a material sample to perform a spectral characterization. Fourier Transform Spectroscopy is an analysis method long used for its spectral accuracy and energy efficiency in environmental monitoring and in forensic analysis among many applications. Frequency comb spectroscopy uses electromagnetic pulses which provide a wide frequency range for the analysis. Frequency comb spectroscopy generally requires a pulsed light source generating the frequency comb.

In U.S. Pat. No. 5,748,309, a Fourier Transform Spectroscopy (FTS) method combining two frequency combs is proposed. The proposed method combines in the optical domain two frequency combs, namely mode-locked lasers, having slightly detuned repetition rates $f_r$, and measures the beating spectra in the Radio Frequency (RF) domain, i.e. the RF beating replica of the optical domain spectrum to be characterized. The beating spectra are obtained by performing a Fourier transformation of the measured time response of the source interference signal (interferogram) in the considered RF band. The stability of the source combs is vital to ensure that the RF beating replica is consistent during a whole measurement interval. Even minor variations of $f_r$ and of the carrier envelope offset (CEO) $f_0$ of any of the mode-locked lasers changes the mapping between the RF beating replica and the optical domain spectrum, thus severely limiting the accuracy of the Fourier transform of the interferogram. In order to maintain the mapping constant between the RF beating replica and the optical domain spectrum, the constraints are extremely high on the stability of the repetition rates and of the carrier envelope offset frequencies of both mode-locked lasers.

I. Coddington, W. C. Newbury and N. R. Newbury, "*Coherent multiheterodyne spectroscopy using stabilized optical frequency combs*", Physical Review Letters 100, 013902 (2008) reports high-resolution complex spectroscopy using mode locked fiber lasers stabilized on two narrow continuous wave fiber lasers. This method transfers the continuous wave laser stability, on the frequency comb beating frequency, but is also sensitive to any remaining instabilities of the continuous wave laser.

The frequency of any line of a mode-locked laser is fully described by the laser repetition rate $f_r$ and the carrier envelope offset frequency $f_0$. The optical referencing is achieved for stabilized values of $f_r$ and $f_0$. In D. J. Jones, S. A. Diddams, J. K. Randa, A. Stentz, R. S. Windeler, J. L. Hall and S. T. Cundiff, "Carrier-Envelope Phase Control of Femtosecond Mode-Locked Lasers and Direct Optical Frequency Synthesis", Science Vol. 288, pp. 635-639 (2000), an auto-referencing of mode-locked frequency comb is proposed using the so-called 1f-2f technique for sources with a spectrum spanning of at least an octave. Using the 1f-2f technique, the carrier envelope offset frequency is canceled and in the case where the repetition rate is also actively locked, long-term stability and referencing of the optical comb is achieved with state of the art accuracy. Some limitations of the 1f-2f techniques are the short-term instabilities induced or left by the active feedback of the mode-locked lasers, and the overall complexity of construction.

Regarding the dual comb Fourier transform technique, international patent application bearing publication no. WO 2007/045461 A1 provides a way to improve the measurement duty cycle by periodically changing the repetition rate of one of the lasers in order to scan only the desired portion of the cross-correlation function, while still relying on the stability of the sources for the measurement duration. U.S. patent application bearing publication no. 2007/0182966 A1 provides an apparatus and method to conduct frequency comb heterodyne spectroscopy with continuous wave lasers. With this method, more than two parameters are likely to be needed to define the mapping between the RF beating replica and the optical domain spectrum.

Therefore, there is a need to address the stability issues of sources such as frequency comb sources when analyzing samples.

SUMMARY

There is provided a method for referencing and correcting the beating spectrum generated by the interference of the components of a frequency comb source. The proposed method allows monitoring of variations of a mapping between the source and the beating replica. This can then be used to compensate small variations of the source in Fourier transform spectroscopy or in any other interferometry application in order to overcome the accuracy and measurement time limitations of the prior art. Constraints on source stability are consequently reduced.

The referencing and correction method described herein is based on the determination of the mean beating frequency for narrowband parts of the source around different constant frequencies and the use of this knowledge in a mapping model that relates the beating spectrum to the source spectra.

It is noted that, throughout the specification, the expression "beating frequency" is intended to include a beating phase temporal distribution such that, when the beating phase temporal distribution is measured or otherwise determined, the beating frequency is thereby also retrieved and is considered to be measured or otherwise determined.

According to a first aspect, there is provided a method for correcting a beating interference signal. The method comprises: 1) providing a frequency comb having frequency components non-uniformly distributed in a source spectrum; 2) interfering the frequency components to produce the beating interference signal having a beating spectrum with beating components, the frequency comb having at least one variable frequency comb parameter; 3) isolating at least one reference beating component subset among said beating components; 4) monitoring at least one of a phase and a frequency of the reference beating component subset, the at least one of the phase and the frequency being related to the at least one variable frequency comb parameter; 5) determining from the at least one of the phase and the frequency a correction function to be applied to the beating interference signal, the correction function to correct for a variation of the variable frequency comb parameter; 6) recording the beating interference signal; and 7) correcting a recorded beating interference signal using the correction function.

According to a second aspect, there is provided an interferometric method for analyzing a sample having a sample signature. The method comprises: 1) providing a frequency comb having frequency components non-uniformly distributed in a source spectrum; 2) interfering the frequency components to produce a beating interference signal having a beating spectrum with beating components, at least a portion of the beating spectrum having a relation with at least a portion of the source spectrum, the frequency comb having at least one variable frequency comb parameter, a variation of the at least one frequency comb parameter causing a variation of the relation; 3) filtering at least part of the frequency comb with the sample to be analyzed to provide a sample interference signal holding the sample signature; 4) recording the sample interference signal, the sample interference signal showing an error due to the variation of the at least one frequency comb parameter; 5) selecting at least one reference beating component subset among said beating components; 6) monitoring at least one of a phase and a frequency of the reference beating component subset, the at least one of the phase and the frequency being related to the at least one frequency comb parameter; 7) determining from the at least one of a phase and a frequency a correction function to be applied to the sample interference signal, the correction function to correct for the variation of the at least one frequency comb parameter; and 8) correcting the recorded sample interference signal using the correction function.

According to a third aspect, there is provided a system for correcting a beating interference signal. The system comprises: 1) a source system for producing a frequency comb having frequency components non-uniformly distributed in a source spectrum, the frequency components to be interfered to produce the beating interference signal having a beating spectrum with beating components, a portion of the beating spectrum having a relation with a portion of the source spectrum, the frequency comb having at least one variable frequency comb parameter; 2) at least one narrowband filter receiving the frequency comb and having a known frequency passband in the source spectrum for isolating a subset of frequency components among the frequency components, the subset of frequency components interfering to provide a reference beating component subset; 3) a phase/frequency analyzer for monitoring at least one of a phase and a frequency of the reference beating component subset; 4) a model calculator receiving the at least one of the phase and the frequency for determining a correction function to be applied to the beating interference signal, the correction function to correct for the at least one variable frequency comb parameter; 5) an acquisition unit for recording the beating interference signal; and 6) a correction unit receiving the recorded beating interference signal and the correction function for correcting the recorded beating interference signal using the correction function.

BRIEF DESCRIPTION OF THE DRAWINGS

FIG. 5 comprises FIG. 5A and FIG. 5B.

DETAILED DESCRIPTION

Figure 11:
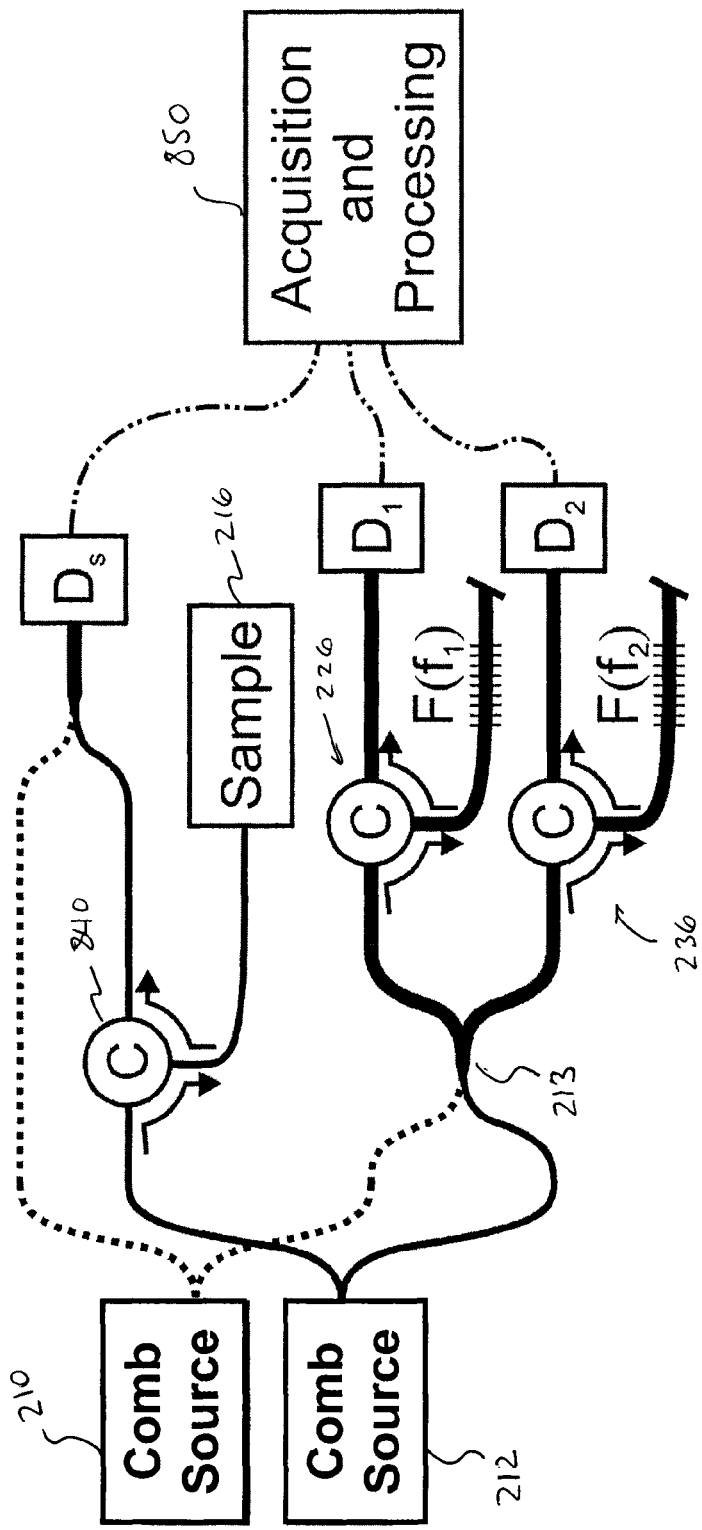
FIG. 11 is a block diagram illustrating an interferometric system similar to the system of FIG. 10, but wherein the sample is probed in reflection.

The herein presented referencing technique is best understood considering the illustrative example of frequency comb Fourier Transform Spectroscopy (cFTS), which is first described in reference to FIGS. 1 to 6, but it is noted that the referencing technique can also be used beyond the herein described applications. For example, the herein described referencing technique can be adapted to be used in Optical Coherence Tomography (OCT). For example, FIG. 11 shows a configuration more adapted to OCT. Other interferometric applications not specifically described herein may also benefit from the referencing technique.

The technique described herein is used to relax the strict requirements on the sources used in cFTS systems. A direct measurement of the beating spectra is performed in conditions where small variations of the sources are allowed. To correct for the resulting variations in the RF beating frequencies, the present technique records the beating fluctuations at two known optical frequencies and, from this information, it determines a correction phase and a new sampling grid for the measured interferogram.

Figure 1:
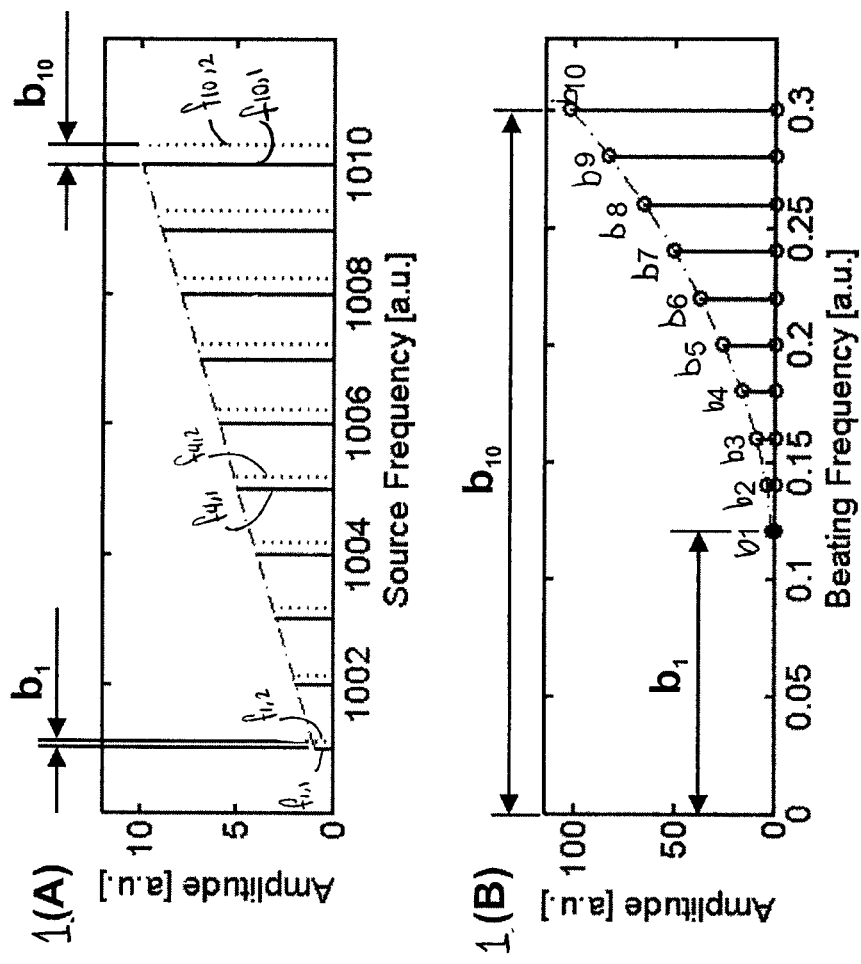
FIG. 1 comprises FIG. 1(A) and FIG. 1(B) which are graphs respectively showing an example optical frequency spectrum and the corresponding beating spectrum of an example dual frequency comb source.

FIG. 1 illustrates a cFTS beating spectrum obtained by interfering two slightly detuned frequency comb sources, and the instantaneous relation between the optical frequency components in the source spectrum and the beating components in the beating spectrum. The frequency components of each frequency comb are determined with two parameters: the repetition rate $f_r$ and the carrier envelope offset frequency $f_0$. The frequency of the $k^{th}$ comb line is thus given by $f_{k,1}=f_{0,1}+k \cdot f_{r,1}$ for the first comb source and $f_{k,2}=f_{0,2}+k \cdot f_{r,2}$ for the second comb source. The complete source is an interleaving of both combs as shown in FIG. 1(A) where the solid lines represent the components from the first comb and the dotted lines, the components from the second comb. In this illustrative example, $f_{r,1}=1$, $f_{r,2}=1.02$, $f_{0,1}=1000$ and $f_{0,2}=1000.1$ and a linear amplitude variation is chosen. The beating components $b_m$ of consideration are presented in FIG. 1(B) and are those corresponding to the beating of the source frequency components $f_{k,1}$ and $f_{k,2}$. Due to the multiplication in the beating process, if the amplitude of the source frequency components increases linearly, the amplitude of the beating components is quadratic. The frequency of the beating component m is given by $b_m=f_0+m \cdot \Delta f_r$ where $f_0=f_{0,2}-f_{0,1}$ (=0.1) and $\Delta f_r=f_{r,2}-f_{r,1}$ (=0.02). Using the fact that the frequency $f_{m1}$ is simply the $m^{th}$ line of the first comb source ($f_{m1}=f_{0,1}+m \cdot f_{r,1}$) the mapping function between $b_m$ and $f_{m1}$ can be determined and this mapping is a simple affine function, i.e. $b_m=G_f f_{m1}+O_f$, where $G_f$ is a scaling factor and $O_f$ is an offset. Other beating subsets may be used as for example the beating components corresponding to the source components $f_{k,2}$ and $f_{k-1,1}$ or with $f_{k,1}$ and $f_{k-1,2}$. Using small enough values of the repetition rate difference ($|f_{r,1}-f_{r,2}|$) and adjusting the offset frequencies ($f_{0,1}$ and $f_{0,2}$) ensures a valid mapping function between the subset of beating components and the source domain for the whole source range. In selecting the appropriate repetition rate difference $\Delta f_r$ and offset frequencies $f_0$, one should consider the folding points reached when the beating frequency modulo $f_r/2$ is close to zero.

Figure 2:
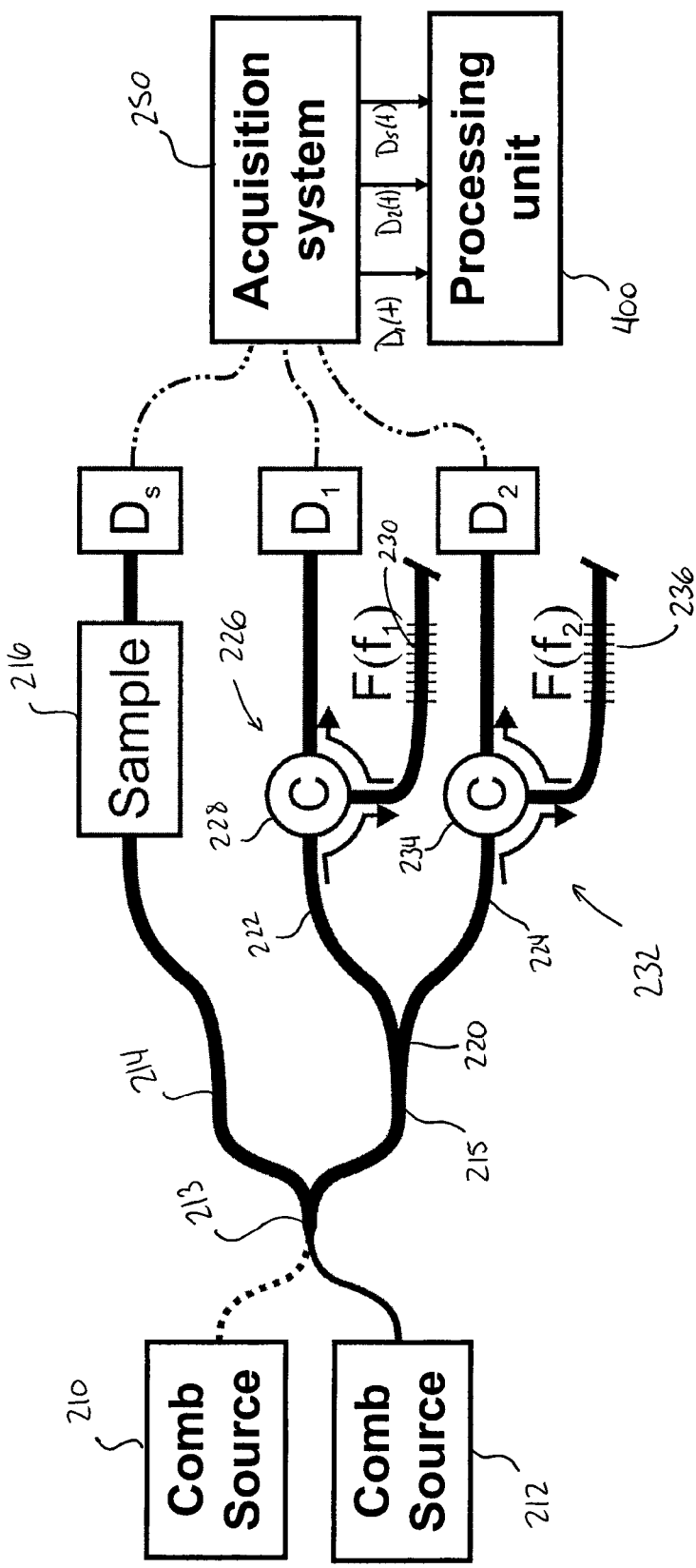
FIG. 2 is a block diagram illustrating an example optical frequency Comb Fourier Transform Spectroscopy (cFTS) system for analyzing spectroscopic properties of a sample and using a referencing technique to reference a frequency comb source.

Now, FIG. 2 shows an example of an optical frequency cFTS system 200 for analyzing spectroscopic properties of a sample 216. The cFTS system 200 makes use of the herein described technique for correcting a beating interference signal, measured at detector $D_s$, for frequency drifts between the first comb source 210 and the second comb source 212. As described below, the beating fluctuations at two known optical reference frequencies $f_1$, $f_2$ are recorded and, from this information, a correction phase and a new sampling grid for the measured interferogram are determined using the algorithm illustrated in FIG. 4 and described hereinbelow. In the system 200 of FIG. 2, the comb sources 210 and 212 are based on two all-fiber mode-locked lasers having slightly different repetition rates $f_r$. The central wavelengths of both lasers are around 1550 nm. The lasers are based on an all-fiber solitonic ring laser configuration using an erbium-doped media for amplification. Even though only thermal stabilization of the lasers is typically used, the remaining slow fluctuations of the repetition rates of both lasers are compensated using the provided referencing technique.

In the cFTS system 200 of FIG. 2, the two comb sources 210, 212 are combined to interfere using an optical coupler 213. The two comb sources 210 and 212 are two nearly identical frequency comb sources adjusted in such a way that the beating spectrum between the modes of the both combs in the radio frequency (RF) beating spectrum is a replica of the optical domain spectra in the source spectrum (the RF spectrum is in fact the multiplication of both comb spectra). The main parameters considered here for each laser are the repetition rate $f_r$ and the carrier envelope offset (CEO) frequency $f_0$.

The combined sources is split onto two optical paths 214 and 215 at the output of the optical coupler 213. In the optical path 214, the optical signal probes a given sample 216 under test and thus experiences a spectral filtering prior to arriving on the detector $D_s$. The resulting interferogram is measured at detector $D_s$ and acquired using the first channel of a three-channel, 50 MS/s acquisition system 250 to provide a beating signal $D_s(t)$ in the RF domain.

The second part of the optical signal which propagates in the optical path 215 is split a second time using an optical coupler 220 in two optical referencing paths 222 and 224 each comprising a narrow band-pass filter 226, 232 used to isolate specific beating components in the optical signal, corresponding to known optical reference frequencies $f_1$, $f_2$. Each band-pass filter 226, 232 consists of a narrow band reflective Fiber Bragg Grating (FBG) 230, 236 centered at a known optical reference frequency, respectively $f_1$ and $f_2$, and an optical circulator 228, 234 to convert the reflection FBG filter 230, 236 into a narrow band-pass transmission filter. The detectors $D_1$ and $D_2$ are used to measure the two reference signals $D_1(t)$, $D_2(t)$ acquired using the two remaining channels of the acquisition system 250. The beating signal $D_s(t)$ is corrected using the two reference signals $D_1(t)$, $D_2(t)$ in the processing unit 400 further described below with reference to FIG. 4.

According to a specific example embodiment, the optical frequency region is centered at 193.5 THz, $f_0$ is around 2.5 THz, $f_r$ is close to 17.58 MHz, the $f_r$ detuning $\Delta f_r$ between the two frequency combs is about 0.3 Hz and the beating bandwidth in the RF band that is equivalent to the laser optical bandwidth is 0.5 MHz, which allows a large working range between 0.5 and 8 MHz. The first FBG filter 230 is centered at $\lambda_1=1555.55$ nm for a bandwidth of 50 GHz whereas the second FBG filter 236 is centered at $\lambda_2=1549.88$ nm with a bandwidth of 3.5 GHz. In this illustrative example, the sample 216 is arbitrarily a FBG used in transmission and having a center wavelength of 1555.55 nm. The optical path lengths of the three optical paths are substantially equal such that negligible degradation of the correction method is observed. It was shown that an optical distance mismatch under tens of centimeters is suitable. The total dispersion of the pulses is estimated at the detector positions using an autocorrelator and the resulting time spreading of the pulses is very small compared to the acquisition sampling interval and thus negligible in this case.

A cFTS measurement using the herein described referencing and correction technique consists of three interferogram signals $D_s(t)$, $D_1(t)$ and $D_2(t)$, one for each path, and measured at detectors $D_s$, $D_1$ and $D_2$. The spectra obtained after a Fast Fourrier Transform (FFT) is applied to these raw interferograms present very narrow and strong components at the repetition rate $f_r$ of the comb sources 210, 212, i.e. around 17 MHz, and at its harmonics (folded in the 25 MHz of available band). It is noted that in order to reduce those unnecessary components that would mask the beating components of interest between the two frequency comb sources 210, 212, 6 dB-slope low-pass electrical filters at 11 MHz are placed before the data acquisition system 250. Two mirrored replicas of the source spectrum are expected in the RF domain under $f_r$ and due to the electrical filtering, only the one under $f_r/2$ is considered.

Figure 3:
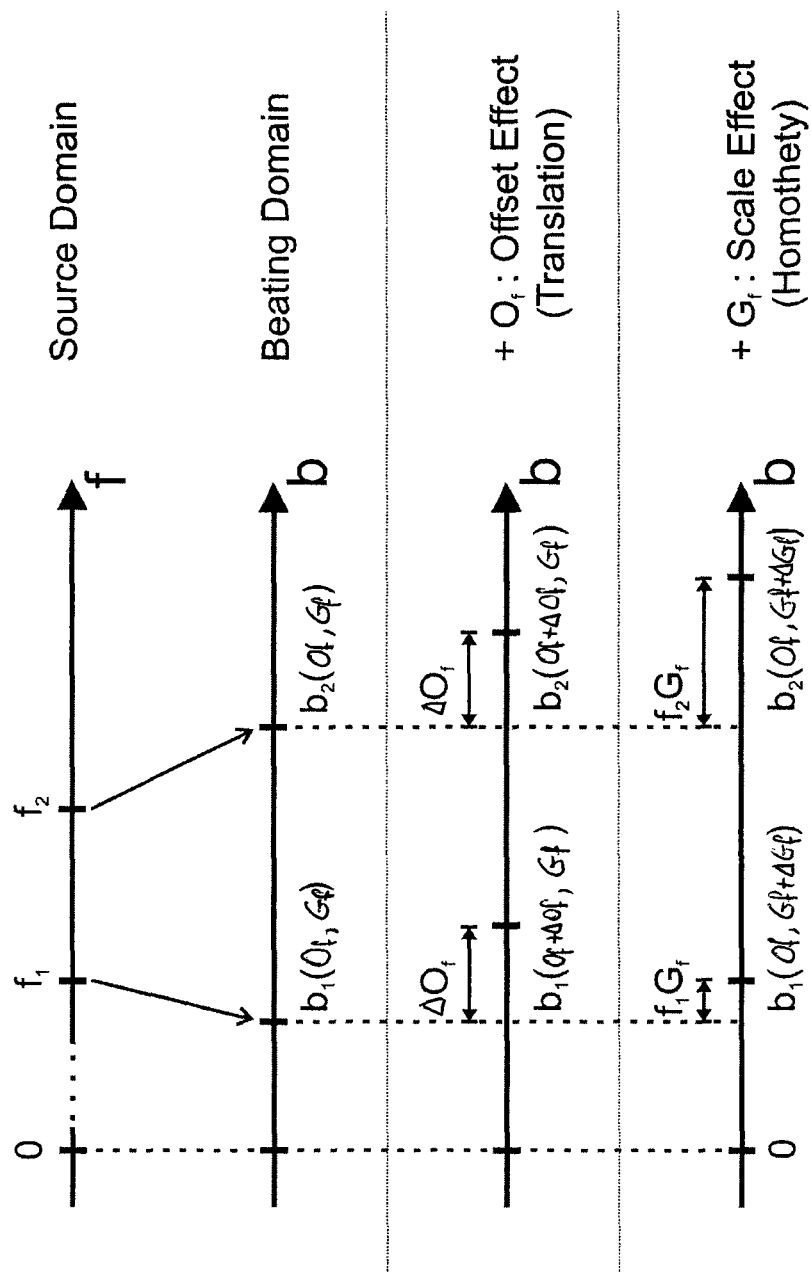
FIG. 3 is a graph illustrating the offset and the scale effect in accordance with the referencing technique, when used with two mode-locked lasers.

When dual mode-locked lasers are used as the comb source, the frequency variations of the source can be expressed in terms of the time variations of the parameters $G_f(t)$ and $O_f(t)$ where $G_f(t)$ is a scaling factor and $O_f(t)$ is an offset. $G_f(t)$ and $O_f(t)$ are related to $f_r$ and $f_0$ of the laser comb source. As illustrated in FIG. 3, taking into account small temporal changes of the lasers (i.e. of $f_r$ and $f_0$), variations in the mapping between the frequency components f and the beating components b are expected, which can be seen as a bandwidth spreading and shifting for the beating replica in the RF domain. A variation $\Delta O_f$ of the parameter $O_f$ induces an offset effect (also called translation) in the mapping function and this effect is mostly due to changes in the parameters $f_{0,1}$ and $f_{0,2}$ of the mode-locked laser comb sources 210, 212. A variation $\Delta G_f$ of the parameter $G_f$ induces a scale effect (also called homothety) in the mapping function and this effect is mostly due to changes in the parameters $f_{r,1}$ and $f_{r,2}$ of the mode-locked laser comb sources 210, 212. In the point of view of the Fourier transformation, the translation induces a time dependent phase contribution whereas the homothety modifies the time delay spacing of the acquired interferograms. For a given optical frequency range where no folding problems are expected, the beating spectrum b(f,t) can be expressed as a translated homothety of the optical source spectrum:

$$b(f,t)=f \cdot G_f(t)+O_f(t).$$

For the specific case of the cFTS, the optical referencing technique allows to determine $G_f$ and $O_f$. According to the described technique, two fixed, distinct and predetermined optical source reference frequencies $f_1$ and $f_2$ in the source domain are considered. The optical source reference frequencies $f_1$ and $f_2$ are defined by the selected optical filters 226 and 232 in the system 200. The beating component subsets, i.e. beating frequencies $b_1(t)$ and $b_2(t)$ in this case in the RF domain are measured for the two fixed source reference frequencies $f_1$ and $f_2$, where t is the measurement time and the beating frequencies are used as a reference to correct the interferograms measured at detector $D_s$. The functions $G_f(t)$ and $O_f(t)$ can be determined with the knowledge of the two reference beating frequencies $b_1(t)$ and $b_2(t)$ as follows:

$$O_f(t)=[f_2 \cdot b_1(t)-f_1 \cdot b_2(t)]/(f_2-f_1), \text{ and}$$

$$G_f(t)=[b_2(t)-b_1(t)]/(f_2-f_1).$$

Using $G_f(t)$ and $O_f(t)$, the referencing of the whole subset of beating components, is accomplished by the inversion of the mapping function:

$$f=(b-O_f(t))/G_f(t).$$

For the cFTS case, it is however more convenient to work with beating components expressed in beating phases rather than in beating frequencies. Integrating the relation linking optical and beating frequencies over time yields:

$$\phi(f,t)=f \cdot G_\phi(t)+O_\phi(t),$$

with $G_\phi(t)$ and $O_\phi(t)$ being respectively defined as:

$$G_\phi(t)=2\pi\int_0^t O_f(\tau)d\tau, \text{ and}$$

$$O_\phi(t)=2\pi\int_0^t O_f(\tau)d\tau.$$

Accordingly, the phase gain and offset are calculated as their frequency counterparts:

$$O_\phi(t)=[f_2 \cdot \phi_1(t)-f_1 \cdot \phi_2(t)]/(f_2-f_1), \text{ and}$$

$$G_\phi(t)=[\phi_2(t)-\phi_1(t)]/(f_2-f_1),$$

where $\phi_1(t)$ and $\phi_2(t)$ are respectively the beating phases corresponding to source reference frequencies $f_1$ and $f_2$.

This shows that the referencing can as well be performed using the inverse phase relation:

$$f=(\phi-O_\phi(t))/G_\phi(t).$$

For this application of the provided technique, $p_1(t)=O_\phi(t)$ and $p_2(t)=G_\phi(t)$ are the two correction parameters required to track and correct the impact of the comb source fluctuations on the beating spectra.

The resulting product of the cFTS is a corrected interferogram. It is therefore not required to strictly invert the model in this case. $G_\phi(t)$ and $O_\phi(t)$ are simply used to directly compute a corrected interferogram.

The variations of the function $G_\phi(t)$ highlights the fact that the original signal was sampled on an equidistant time grid but not on an equidistant phase grid. A constant phase grid is usually desired in interferometry and especially in Fourier transform spectroscopy. Consequently, for correcting the beating interference signal $D_s(t)$, a new phase equidistant grid is defined on the range of $G_\phi(t)$. Before being allowed to apply a reinterpolation of the cFTS interferogram on the new grid, the contribution of $O_\phi(t)$ is removed by the multiplication with the correction phase function $e^{-jO_\phi(t)}$. This is valid as long as the mapping function exists.

Figure 4:
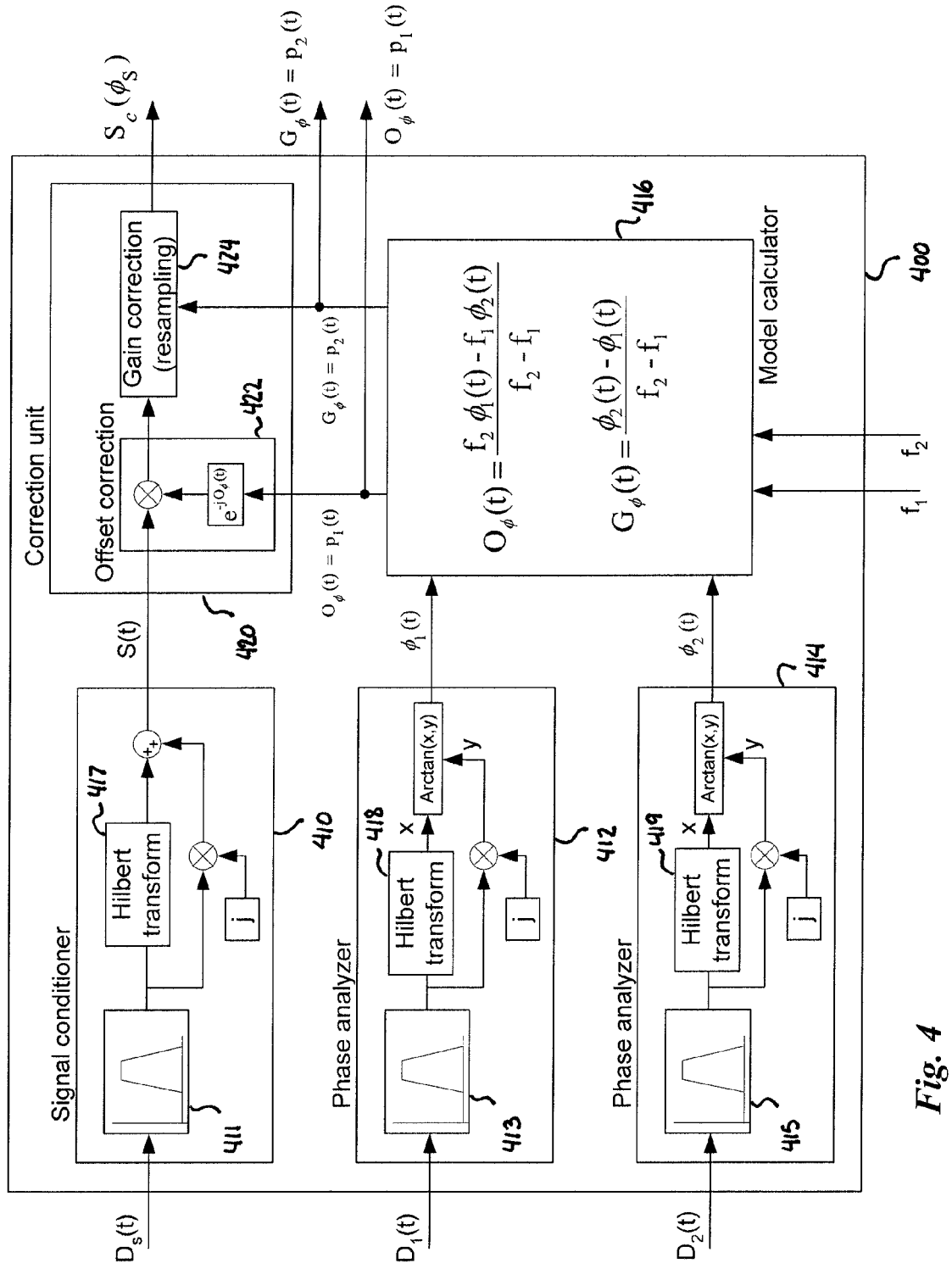
FIG. 4 is a block diagram illustrating a processing unit for correcting an interferogram for a variation in the scaling factor and the offset parameters of the frequency comb source.

FIG. 4 illustrates this referencing technique typically performed in the processing unit 400. The processing unit 400 receives the beating interference signal $D_s(t)$ of the interferogram to be corrected and the reference signals $D_1(t)$, $D_2(t)$ acquired at $D_1$ and $D_2$ in the system 200 of FIG. 2. As described previously, the two reference signals $D_1(t)$, $D_2(t)$ correspond to the optical signal filtered in narrow bands around the known reference frequencies $f_1$ and $f_2$ to isolate specific beating components. The beating signal $D_s(t)$, the reference signal $D_1(t)$ and the reference signal $D_2(t)$ are respectively received at a signal conditioner 410, a first phase analyzer 412 and a second phase analyzer 414. A model calculator 416 is connected to the output of the two phase analyzers 412, 414 to compute the gain $G_\phi$ and offset $O_\phi$ parameters which are provided to a correction unit 420 for correcting the beating interference signal.

In the signal conditioner 410, an analytic interferogram signal S(t) arising from the beating interference signal $D_s(t)$ can be computed. This is done using the Hilbert transform. Some filtering may be performed using band-pass filter 411 before the demodulation.

In the phase analyzers 412 and 414, the beating phases $\phi_1(t)$, $\phi_2(t)$ (or alternately beating frequencies $b_1(t)$, $b_2(t)$) corresponding to reference optical frequencies $f_1$ and $f_2$ are determined from the reference signals $D_1(t)$, $D_2(t)$. This involves basically a phase (or frequency) demodulation that can be implemented efficiently using a Hilbert transformation. Some filtering may be performed using band-pass filters 413 and 415 to better isolate the relevant signal before the demodulation.

In the model calculator 416, the gain $G_\phi$ and offset $O_\phi$ parameters are computed from the determined beating phases $\phi_1(t)$, $\phi_2(t)$, using the relations provided by the physical model given above.

The computed parameters $G_\phi(t)$ and $O_\phi(t)$ are provided to the correction unit 420 for correcting the interferogram signal S(t). The correction comprises an offset correction 422, followed by a gain correction 424. The offset correction 422 is performed by subtracting the offset phase $O_\phi(t)$ from the analytic interferogram signal S(t) through a multiplication by $e^{-jO_\phi(t)}$. The gain correction 424 uses the phase relation $G_\phi(t)$ to resample the analytic interferogram signal S(t) on an equidistant phase grid (or equivalently on an equidistant optical time delay grid). The result is a corrected complex interferogram $S_c(\phi_s)$.

The corrected complex interferogram $S_c(\phi_s)$ is output and can be Fourier transformed to obtain a corrected beating spectrum. The computed parameters $G_\phi(t)$ and $O_\phi(t)$ are also output.

It is pointed out that for cFTS systems where the mapping between the optical and RF domain is a pure homothety (no offset frequency), such as when the CEO of the lasers are cancelled, a single reference beating frequency $b_1(f_1,t)$ is required, which provides the gain function $G_\phi(t)$. More than two parameters may also be corrected for in applications where it is required, using more than two reference beating components (see FIG. 7).

It is noted that in applications where a Fourier transform of the interference pattern is not needed and where only its local phase (or frequency) is of interest, the correction processing can be somewhat different from that illustrated in FIG. 4. The correction may then be performed without any resampling if the derivative of the sample phase is extracted. The correction is then a direct inversion of the model and the corrected phase (or frequency) may be reconstructed by integrating the inverted frequency estimate. Monitoring passive fiber optic sensors in distributed networks can be achieved at great speed and sensitivity using such an approach.

Figures 5A, 5B:
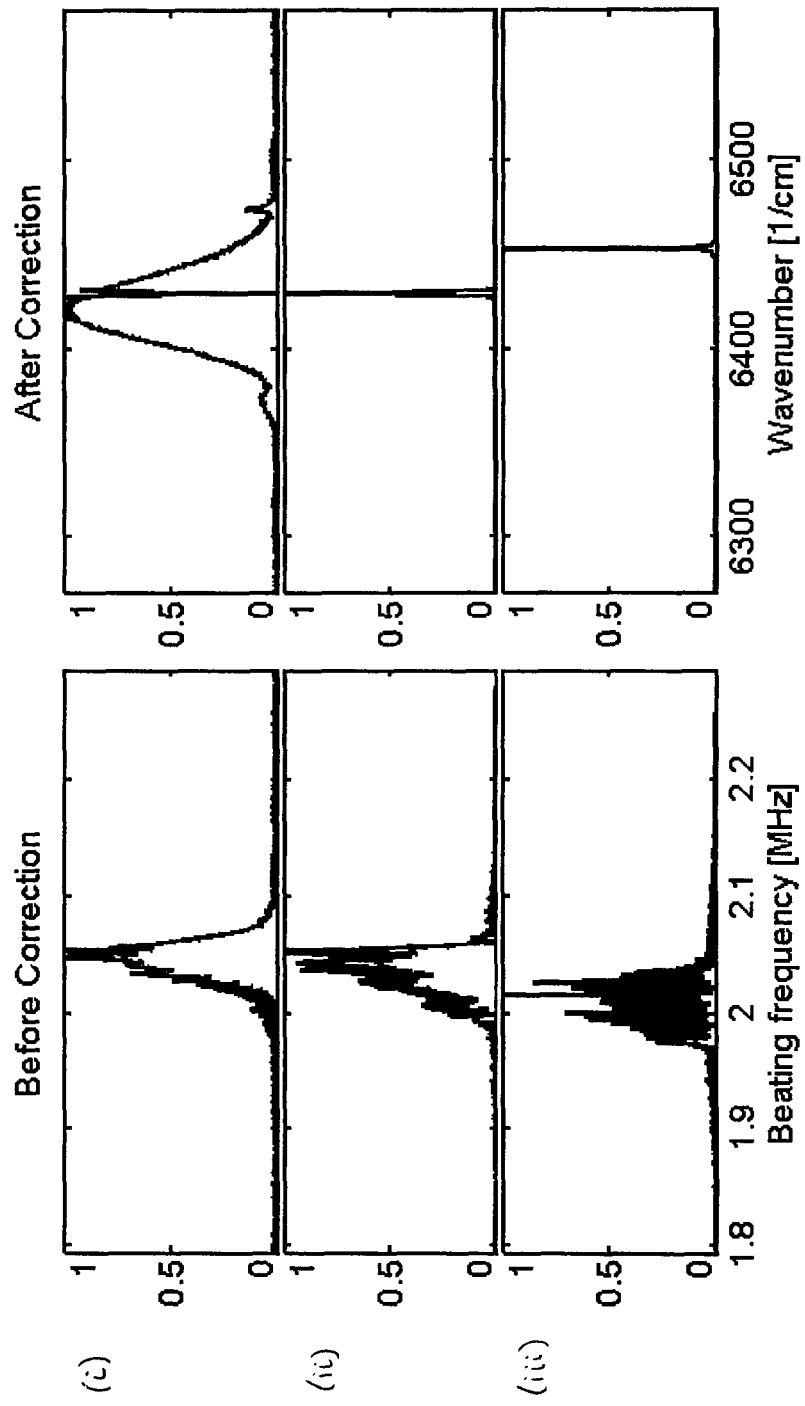
FIG. 5A includes three graphs showing a sample beating spectrum (i) and two reference beating spectra (ii) and (iii) before correction.
FIG. 5B includes three graphs showing a sample optical spectrum (i) and two reference optical spectra (ii) and (iii) after correction.

FIG. 5A shows the uncorrected spectral response of the beating interference signal $S(t)$ (i) corresponding to the characterized sample and both reference signals $D_1(t)$ (ii) and $D_2(t)$ (iii) according to the example embodiment of FIG. 2 described hereinabove. In this measurement, the central beating frequency is about 2 MHz and the bandwidth is about 0.5 MHz. The significant spectral spreading of the reference signals $D_1(t)$, $D_2(t)$ is due to the fluctuations of the comb sources 210, 212. The spectrum response of beating interference signal $S(t)$ and corresponding to the probed sample is also very different from a smooth laser spectrum as would be expected and no clear filtered band due to the sample is discernable.

The offset $O_\phi(t)$ and the gain $G_\phi(t)$ phases required to correct the interferogram from the sample path are then calculated as described above and the beating interference signal $S(t)$ is corrected. FIG. 5B shows the corrected spectral response corresponding to the beating interference signal $S(t)$ (i) and to reference signals $D_1(t)$ (ii) and $D_2(t)$ (iii). The corrected spectral response of the reference signals are narrowband and properly located around $f_1$ and $f_2$ as expected, and the corrected spectral response of the beating interference signal $S(t)$ is clean, the band filtered by the sample is clearly discernable.

Figure 6:
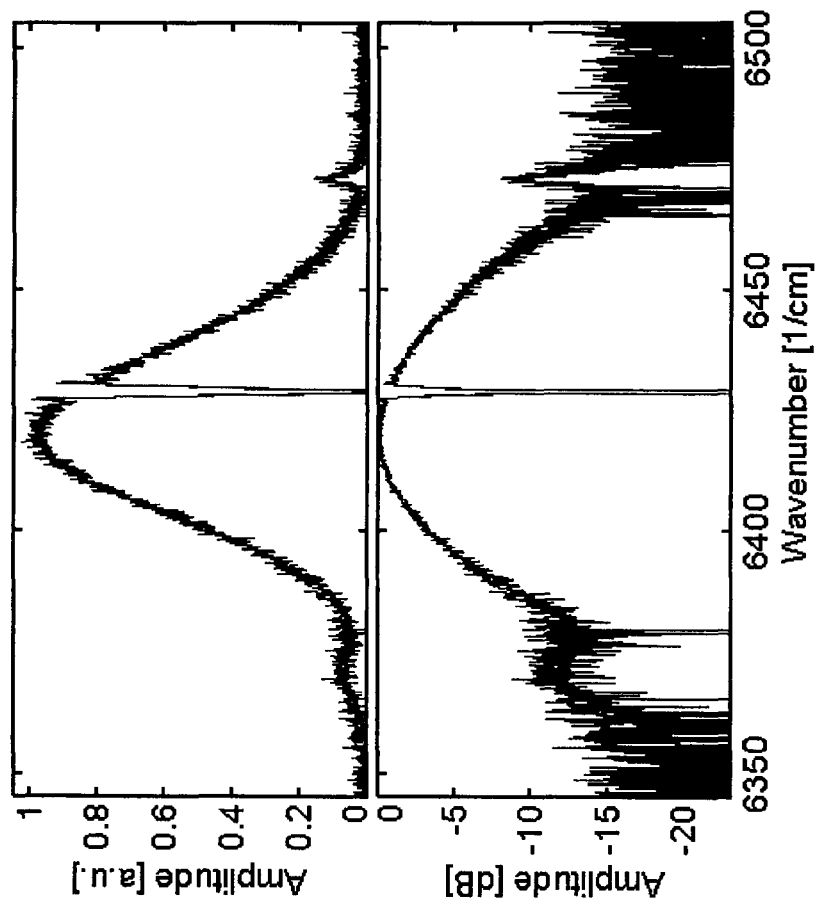
FIG. 6 comprises two graphs showing the corrected sample optical spectrum of FIG. 5B superposed with two other similar measurements presented on a linear scale (top graph) and on a logarithmic scale (bottom graph)

FIG. 6 shows the superposition of three corrected spectral responses corresponding to the beating interference signal $S(t)$, presented on a linear scale (top) and on a logarithmic scale (bottom). As expected, the grating notch filtering at 1555.55 nm and corresponding to the sample is observed in the corrected spectra. The optical path length difference range equivalent in a standard FTS for these measurements is larger than 70 mm, which provides a spectral resolution under 0.15 cm$^{-1}$.

Figure 7:
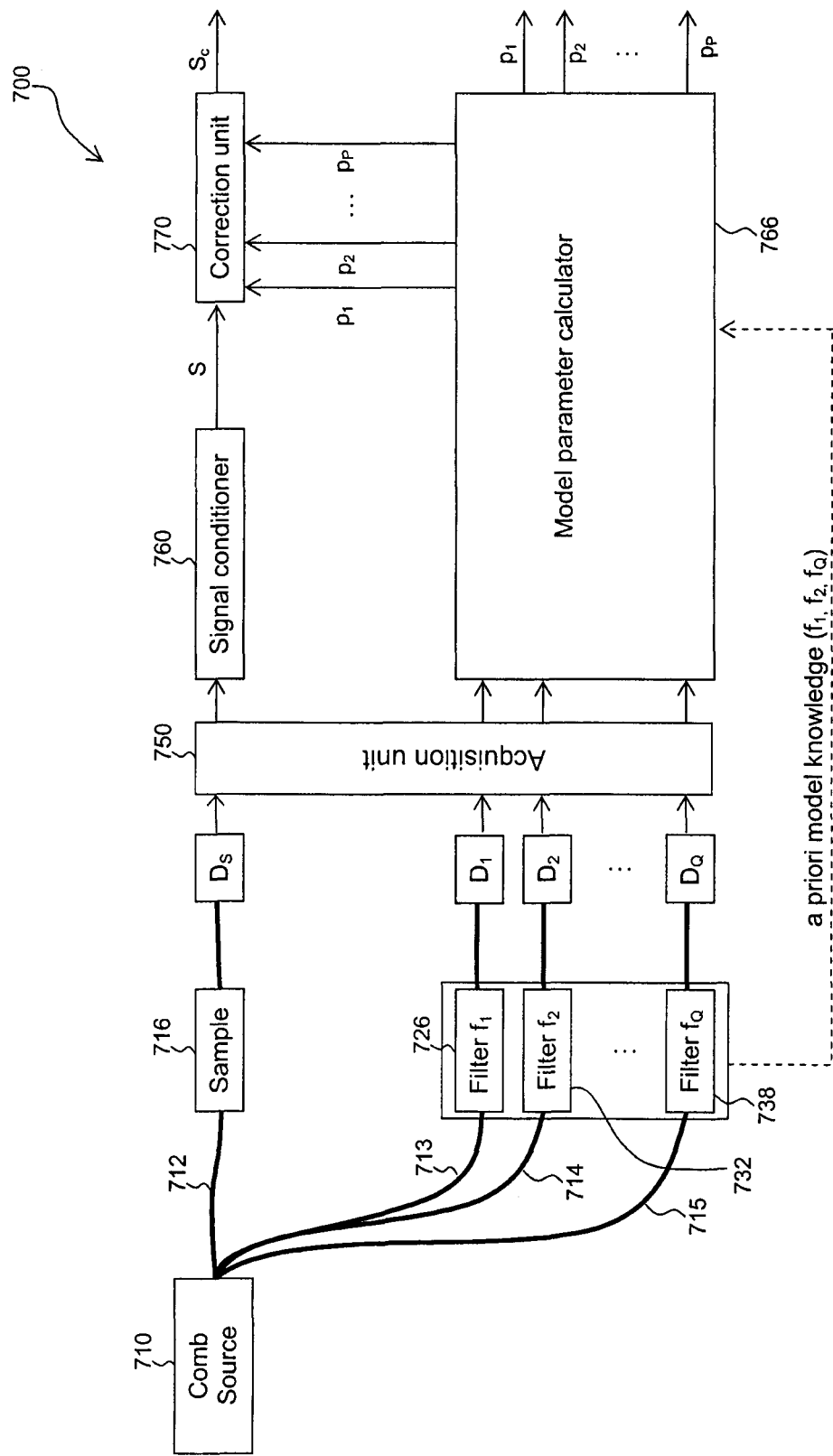
FIG. 7 is a block diagram illustrating an interferometric system using the referencing method, according to a generalized example of the system of FIG. 2.

Now referring to FIG. 7, the referencing technique described herein can be generalized for use in various applications and with various types of frequency comb sources, not necessarily based on a combination of two mode locked-lasers. The system 700 can be understood as a generalization of the system 200 of FIG. 2.

The interferometric system 700 of FIG. 7 is used to analyze a sample 716. As in system 200 of FIG. 2, the system 700 has a comb source 710 which may be, as in the system 200, a combination of two frequency comb sources each with uniformly distributed frequency components, resulting in a comb with frequency components non-uniformly distributed. More generally, any comb source 710 producing a frequency comb with non-uniformly distributed frequency components may also be used. The comb source 710 is split on multiple paths 712, 713, 714, 715, one of which, i.e. paths 712, to probe the sample 716 and the others 713, 714, 715 reaching respectively the narrowband filters 726, 732, 736 with central frequencies $f_1$, $f_2$, $f_Q$ respectively. The filters 726, 732 and 736 are used to isolate specific beating components of the frequency comb by each isolating a subset of frequency components corresponding to known reference frequencies $f_1$, $f_2$, $f_Q$. Detector $D_s$ detects the beating interference signal at the output of the sample 716 while $D_1$, $D_2$, $D_Q$ are used to measure the reference signals at the output of filters 726, 732, 736. The detected beating interference signal and reference signals are acquired using the acquisition unit 750.

The acquired beating interference signal and reference signals are respectively received at a signal conditioner 760 and model calculator 766. The model calculator 766 generally computes parameters $p_1$, $p_2$, $p_P$ which are provided to a correction unit 770 for correcting the beating interference signal, to output a corrected beating interference signal.

The frequency comb is defined as consisting of N distinct frequency components $f_n$ (n from 1 to N and $f_n<f_{n+1}$). The interference of two different comb components $m_1$ and $m_2$ ($m_1<m_2$) generates a beating signal $b_m$ at their frequency difference ($b_m=f_{m2}-f_{m1}$). The referencing is applicable for a subset of M contiguous beating frequency components $b_m$ (m from 1 to M) that fulfills the following conditions:
1) $b_m<b_{m+1}$;
2) The mapping function that relates the beating component $b_m$ to the frequency $f_{m1}$ in the interval $[f_1,f_N]$ can be expressed using a set of P frequency independent parameters $p_x$ ($p_1$ to $p_P$), possibly with the knowledge of the mapping function at a given initial time $t_0$; It is noted that in the specific example described herein in reference to FIG. 2, P is equal to 2, the two parameters being the gain $p_2=G_f$ and the offset $p_i=O_f$;
3) The parameters $p_x(t)$ at a given time t can be determined from at least Q beating frequencies $B_q$ ($B_1$ to $B_Q$) that correspond to the mean beating frequency in the interval $[b_1,b_M]$ for narrowband filtered versions of the source around the known and distinct frequencies $f_q$, respectively; It is noted that in the specific example described herein in reference to FIG. 2, Q is equal to 2.

The referencing is obtained by measuring the beating frequencies $B_q$, calculating the parameters $p_x$ (possibly measuring the initial mapping at $t_0$) and finally inverting the mapping function to translate the beating frequencies into source frequencies.

Starting form the specific embodiment described above, several alternative embodiments can be described for a variety of applications or for different comb sources.

Figure 8:
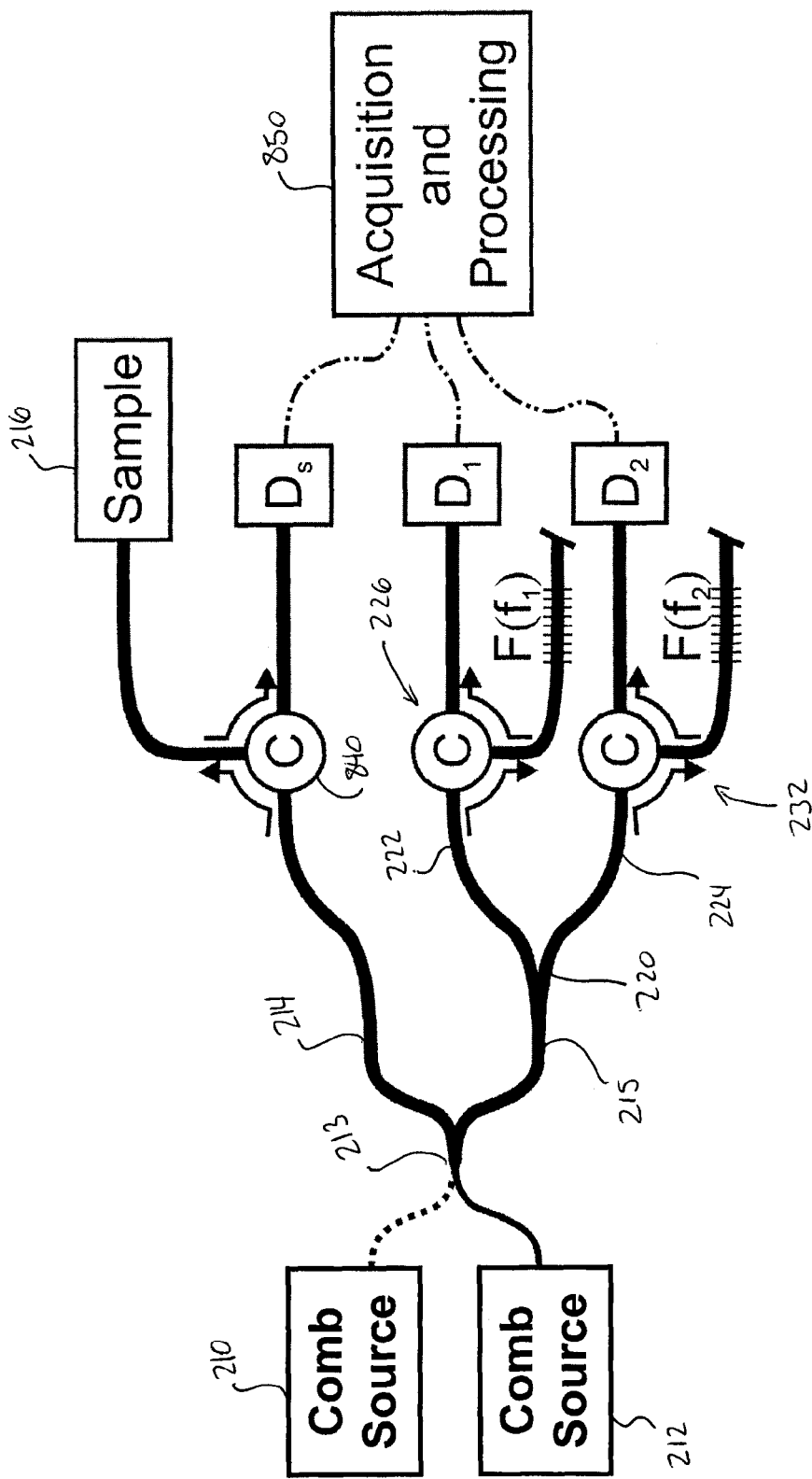
FIG. 8 is a block diagram illustrating a cFTS system similar to the system of FIG. 2, but wherein the sample is probed in reflection.

FIG. 8 illustrates a cFTS application system similar to the system 200 of FIG. 2, but where the sample 216 is probed in reflection instead of transmission. An optical circulator 840 is used to probe the sample 216. For simplicity of illustration only, the acquisition system 250 and the processing unit 400 of FIG. 2 are combined in a single acquisition and procession box 850 in FIG. 8. Other components remain unchanged or equivalent from the system 200 of FIG. 2 and are therefore not repetitively described. It is noted that a retro-reflecting scheme can also be used for free-space reflecting samples.

Figure 9:
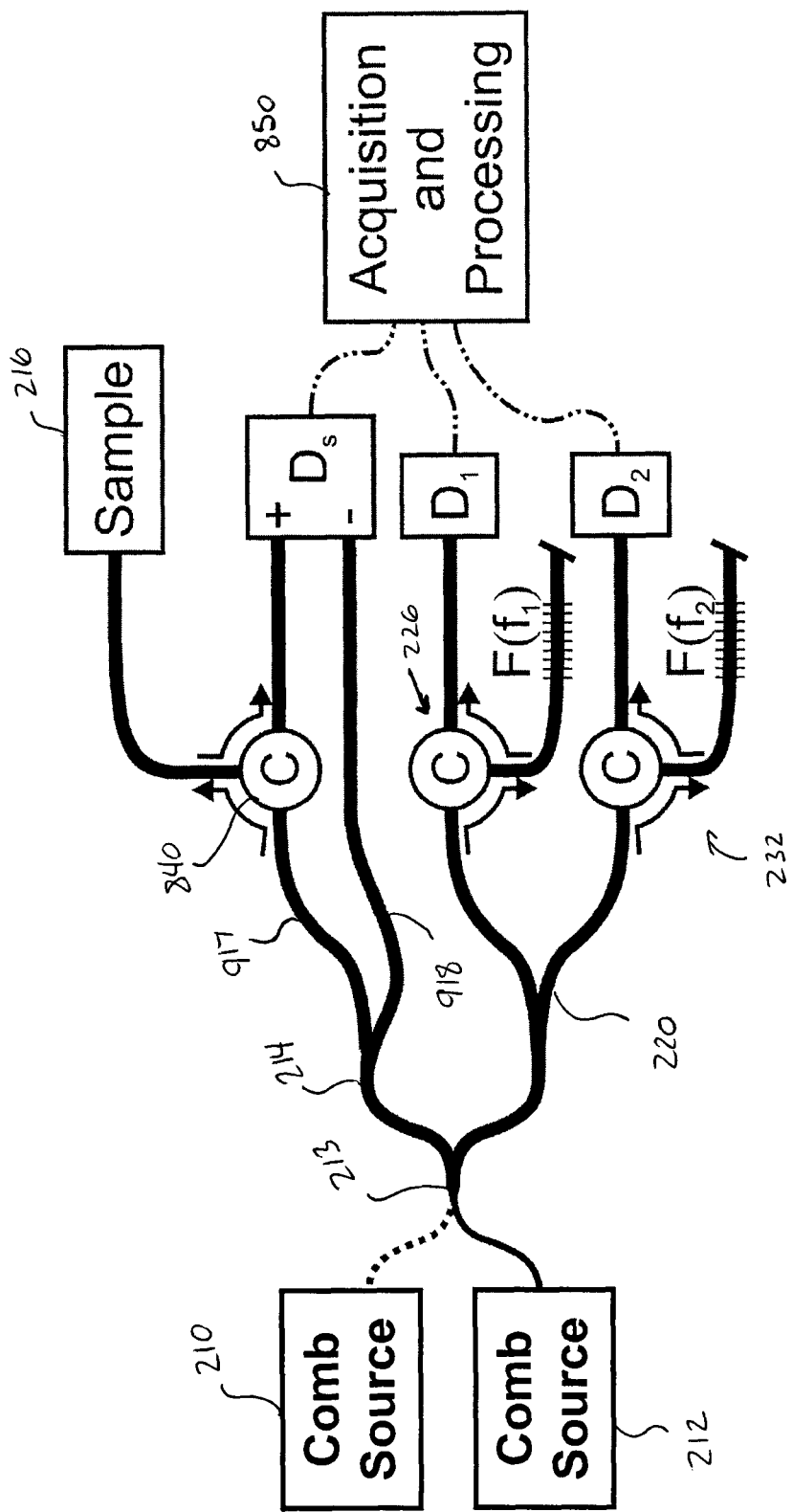
FIG. 9 is a block diagram illustrating a cFTS system similar to the system of FIG. 2, but wherein a differential spectroscopy scheme is used with a sample probed in reflection.

FIG. 9 illustrates a differential spectroscopy scheme used with a reflective sample 216. Again, the scheme of FIG. 9 is similar to the one of FIG. 2 and similar or equivalent components and arrangements are not repetitively described. In the system of FIG. 9, the interference beating signal is split on two optical paths 917 and 918. The optical path 917 probes the sample 216, while the optical path 918 remains unfiltered. A balanced photodetector $D_s$ performs the subtraction of the optical signals at the end of the two optical paths 917 and 918. This allows for a direct measurement of the sample response, provided that the two paths 917, 918 to the differential detector are as identical as possible. The same scheme can also be used with a sample 216 in transmission.

Figure 10:
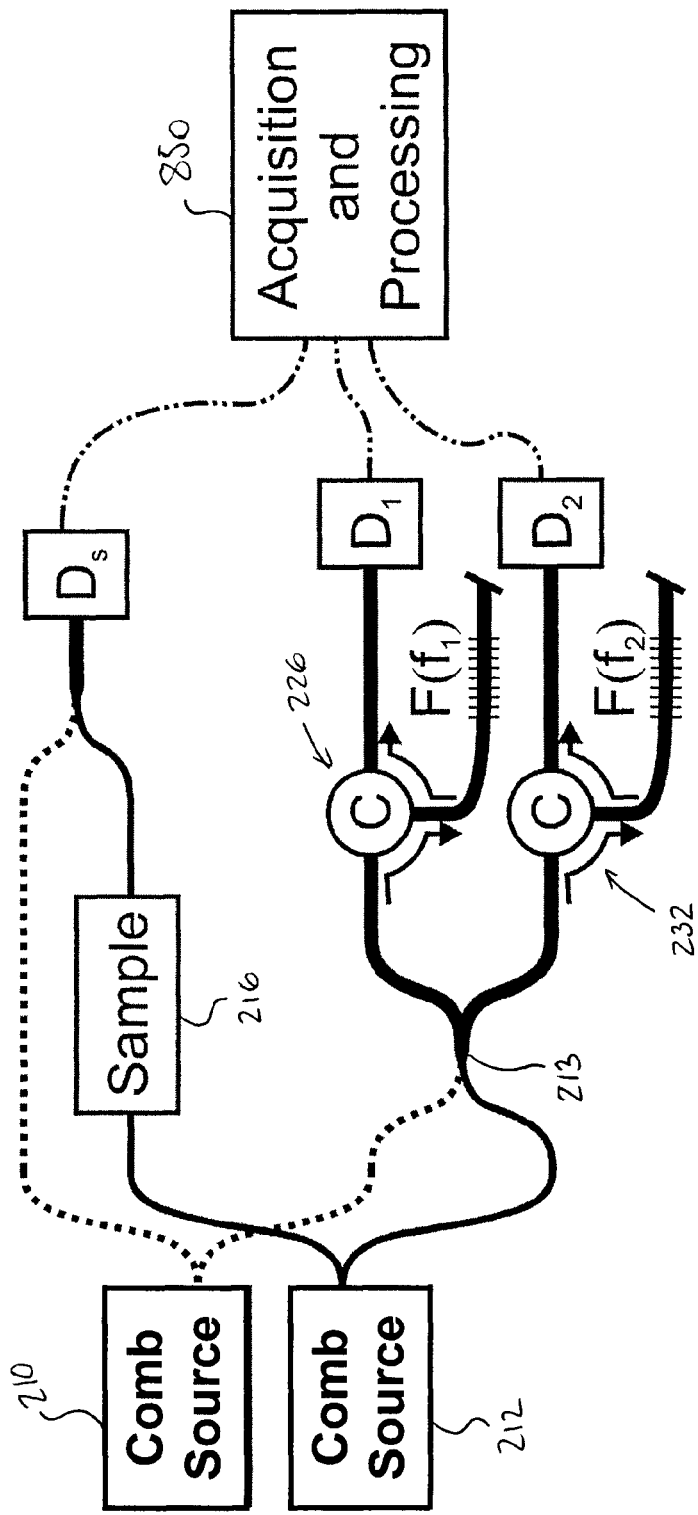
FIG. 10 is a block diagram illustrating an interferometric system similar to the system of FIG. 2, but adapted for use in complex spectroscopy and wherein the sample is probed in transmission.

All the discussion about Fourier transform spectroscopy with frequency combs can be extended to complex spectroscopy where one of the comb source probes a sample prior to the combination with the second comb source. The obtained interference pattern is a convolution between the combined source and the complex impulse response of the sample. FIG. 10 illustrates a scheme that can be used for complex spectroscopy with a sample 216 probed in transmission. In such a configuration the sample 216 is probed only by the frequency comb generated by the comb source 212. The other frequency comb, generated by the source 210, remains unfiltered before being combined with the frequency comb at the output of the sample 216. It is the resulting combined frequency combs that are detected at detector $D_s$. The remaining of the scheme remains unchanged or equivalent compared to the system of FIG. 2 and such similar components and arrangements are not repetitively described. Using this scheme the amplitude as well as the phase spectrum of the sample 216 is measured. This can be useful to determine the complex transmittance (absorbance and dispersion) of the sample 216.

FIG. 11 shows an approach similar to the one illustrated in FIG. 10 but probing the sample 216 in reflection using an optical circulator 840. Besides the complex spectroscopy application, this embodiment can be used to retrieve the spatial phase and amplitude profile along the depth of the sample 216. Optical low coherence reflectometry and optical coherence tomography are techniques based upon a similar principle embodied with a classical Michelson or Mach-Zehnder interferometer.

Figure 12:
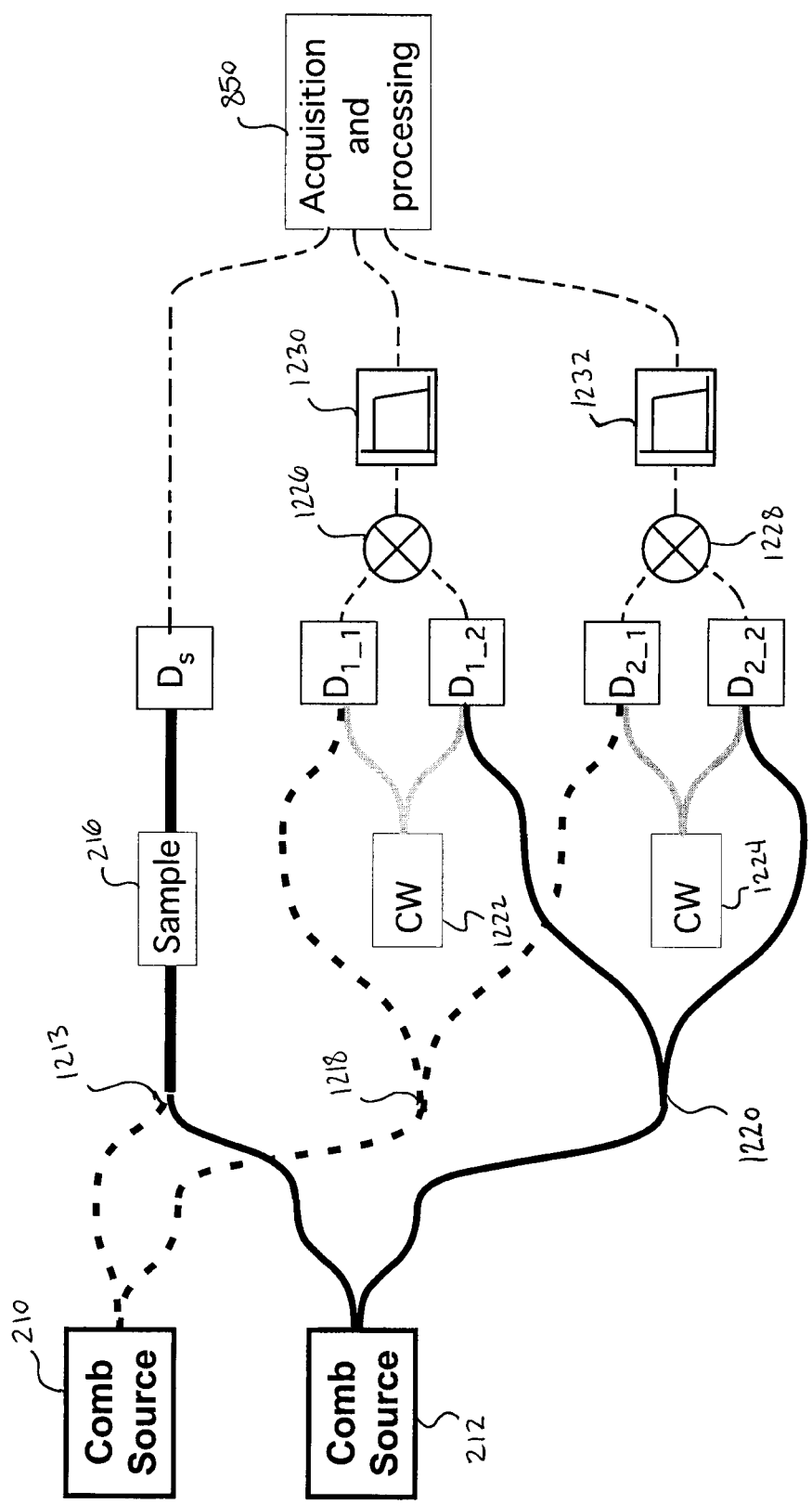
FIG. 12 is a block diagram illustrating a cFTS system similar to the system of FIG. 2, but using active filtering instead of passive optical filtering.

FIG. 12 shows another interferometric system that makes use of the herein described referencing technique. The system of FIG. 12 uses an active filtering technique instead of the passive filters 226 and 232 of the system of FIG. 12. Such an active technique involves continuous wave sources and electrical filtering, where continuous wave sources 1222, 1224 are used to down-convert a limited number of lines from each frequency comb in the band-pass of an electrical filter 1230, 1232.

Similarly to the system 200 of FIG. 1, the two comb sources 210 and 212 are combined to interfere using an optical coupler 1213, resulting in an optical signal probing the sample 216 before being detected at detector $D_s$.

In parallel, for referencing, the comb sources 210 and 212 are each split using respectively an optical coupler 1218 and 1220 to be each combined with a first continuous wave sources 1222 and with a second continuous wave sources 1224. The combination of the first comb source 210 with the first continuous wave source 1222 is detected at detector $D_{1\_1}$; the combination of the second comb source 212 with the first continuous wave source 1222 is detected at detector $D_{1\_2}$; the combination of the first comb source 210 with the second continuous wave source 1224 is detected at detector $D_{2\_1}$; and the combination of the second comb source 212 with the second continuous wave source 1224 is detected at detector $D_{2\_2}$. The signals detected at $D_{1\_1}$ and $D_{1\_2}$ are then mixed to interfere using a multiplier 1226 and filtered with a low-pass electric filter 1230 in order to isolate one first reference beating component subset. Similarly, the signals detected at $D_{2\_1}$ and $D_{2\_2}$ are mixed to interfere using a multiplier 1228 and filtered with a low-pass electric filter 1232 in order to isolate one second reference beating component subset. This active filtering which uses a continuous wave source is equivalent to a narrow band-pass filtering with a central frequency corresponding to the frequency of continuous wave source 1222 or 1224.

It is noted that in the active filtering scheme of FIG. 12, the low-pass electric filters 1230, 1232 may also be placed before the multipliers 1226, 1228, i.e. one after each detector $D_{1\_1}$, $D_{1\_2}$, $D_{2\_1}$, $D_{2\_2}$, instead of after.

In another embodiment, the comb source(s) may be replaced by one or several continuous wave lasers in which the several spectral modes have a non-equidistant spacing in such a way as to produce a non-degenerate beating spectrum, such a source is provided for example in U.S patent application bearing publication no. 2007/0182966 A1. This is achieved, for example, with significant dispersion in the laser cavity. The referencing technique then allows the characterization of the dispersion and its temporal evolution.

A non-uniform frequency comb or multiple combs may also be generated with a single mode-locked laser source, using polarization multiplexing or pulse interaction within the laser cavity for example. The referencing technique then still yields a reliable optical referencing.

Embodiments involving frequency comb sources of a different nature than optical, such as Terahertz or acoustical combs can also benefit from the referencing technique. In all cases the down-conversion occurring in the beating spectrum process provides a measurement gain proportional to the down-conversion factor. The referencing technique references the beating signal rather than the frequency comb sources and the characterization of the down-conversion relation is accordingly more precise in the beating spectrum domain than in the original source domain.

While illustrated in the block diagrams as groups of discrete components communicating with each other via distinct data signal connections, it will be understood by those skilled in the art that the preferred embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

The embodiments of the invention described above are intended to be exemplary only. The scope of the invention is therefore intended to be limited solely by the appended claims.

What is claimed is:

1. A method for correcting a beating interference signal, the method comprising:
providing a frequency comb having frequency components non-uniformly distributed in a source spectrum;
interfering the frequency components to produce the beating interference signal having a beating spectrum with beating components, the frequency comb having at least one variable frequency comb parameter;
isolating at least one reference beating component subset among said beating components;
monitoring at least one of a phase and a frequency of the reference beating component subset, the at least one of the phase and the frequency being related to the at least one variable frequency comb parameter;
determining from the at least one of the phase and the frequency a correction function to be applied to the beating interference signal, the correction function to correct for a variation of the variable frequency comb parameter;
recording the beating interference signal; and
correcting a recorded beating interference signal using the correction function.

2. The method as claimed in claim 1, wherein providing the frequency comb comprises combining a first frequency comb and a second frequency comb.

3. The method as claimed in claim 2, wherein providing the frequency comb comprises generating the first frequency comb using a first mode-locked laser and generating the second frequency comb using a second mode-locked laser.

4. The method as claimed in claim 1, wherein said isolating at least one reference beating component subset comprises:
filtering a portion of the source spectrum of the frequency comb.

5. The method as claimed in claim 4, wherein at least one of the at least one reference beating component subset has a single reference beating component and wherein filtering the portion of the source spectrum of the frequency comb comprises using a filtering bandwidth selecting a single pair of the frequency components in the source spectrum to isolate the single reference beating component.

6. The method as claimed in claim 4,
wherein providing the frequency comb comprises combining a first frequency comb source and a second frequency comb source; and
wherein isolating at least one reference beating component subset comprises:
filtering a first frequency component subset among the frequency components of the first frequency comb and filtering a second frequency component subset among the frequency components of the second frequency comb, the first frequency component subset and the second frequency component subset located within a known frequency band in the source spectrum; and
interfering the first frequency component subset and the second frequency component subset to provide the isolated beating component subset.

7. The method as claimed in claim 6,
wherein filtering the first frequency component subset and filtering the second frequency component subset comprise filtering the first frequency comb and the second frequency comb using a passive band-pass filter with the known frequency passband in the source spectrum to provide respectively the first frequency component subset and the second frequency component subset, the first frequency component subset and the second frequency component subset interfering to provide the reference beating component subset; and
wherein said monitoring comprises detecting the reference beating component subset to provide a reference beating signal in the beating spectrum, and monitoring at least one of the phase and the frequency of the reference beating signal.

8. The method as claimed in claim 7, wherein using the passive band-pass filter comprises using a fiber Bragg grating filter in reflection.

9. The method as claimed in claim 1, wherein said isolating at least one reference beating component subset comprises actively filtering a portion of the source spectrum of the frequency comb using an active filter with the known frequency passband in the source spectrum.

10. The method as claimed in claim 9,
wherein providing the frequency comb comprises combining a first frequency comb and a second frequency comb; and
wherein actively filtering comprises:
interfering the first frequency comb with a reference continuous wave source to provide a first intermediate interference signal;
detecting the first intermediate interference signal to provide a first intermediate reference signal with beating components;
filtering the beating components of the first intermediate reference signal to retain a first intermediate reference beating component subset;
interfering the second frequency comb with the reference continuous wave source to provide a second intermediate interference signal;
detecting the second intermediate interference signal to provide a second intermediate reference signal with beating components;
filtering the beating components of the second intermediate reference signal to retain a second intermediate reference beating component subset; and
interfering the first intermediate interference signal and the second intermediate interference signal to provide the at least one reference beating component subset.

11. The method as claimed in claim 1,
wherein the at least one reference beating component subset comprises a first reference beating component subset and a second reference beating component subset, and the at least one variable frequency comb parameter comprises a frequency offset parameter and a frequency scaling parameter;
wherein said determining comprises computing correction parameters comprising an offset correction phase and a correction gain; and
wherein said correcting the beating interference signal comprises subtracting the offset correction phase from the beating interference signal and resampling the beating interference signal on an equidistant phase grid using the correction gain.

12. The method as claimed in claim 1, wherein said at least one frequency comb parameter comprises P frequency comb parameters and said at least one reference beating component subset comprises Q reference beating components, wherein a value of P is of at least one and a value of Q is of at least one.

13. The method as claimed in claim 1, further comprising outputting the corrected beating interference signal.

14. The method as claimed in claim 1, wherein the correction function is defined by at least one correction parameter and the method further comprises outputting the at least one correction parameter.

15. The method as claimed in claim 1, further comprising probing a sample with at least part of the frequency comb to provide the beating interference signal.

16. An interferometric method for analyzing a sample having a sample signature, the method comprising:
providing a frequency comb having frequency components non-uniformly distributed in a source spectrum;
interfering the frequency components to produce a beating interference signal having a beating spectrum with beating components, at least a portion of the beating spectrum having a relation with at least a portion of the source spectrum, the frequency comb having at least one variable frequency comb parameter, a variation of the at least one frequency comb parameter causing a variation of the relation;
filtering at least part of the frequency comb with the sample to be analyzed to provide a sample interference signal holding the sample signature;
recording the sample interference signal, the sample interference signal showing an error due to the variation of the at least one frequency comb parameter;
selecting at least one reference beating component subset among said beating components;

monitoring at least one of a phase and a frequency of the reference beating component subset, the at least one of the phase and the frequency being related to the at least one frequency comb parameter;

determining from the at least one of a phase and a frequency a correction function to be applied to the sample interference signal, the correction function to correct for the variation of the at least one frequency comb parameter; and correcting the recorded sample interference signal using the correction function.

17. The method as claimed in claim 16, wherein providing the frequency comb comprises combining a first frequency comb and a second frequency comb.

18. The method as claimed in claim 16, wherein said selecting at least one reference beating component subset comprises:

filtering a portion of the source spectrum of the frequency comb.

19. The method as claimed in claim 18, wherein at least one of the at least one reference beating component subset comprises a single beating component and wherein filtering the portion of the source spectrum of the frequency comb comprises using a filtering bandwidth selecting a single pair of the frequency components in the source spectrum to isolate the single reference beating component.

20. The method as claimed in claim 18, wherein providing the frequency comb comprises combining a first frequency comb source and a second frequency comb source; and wherein selecting at least one reference beating component subset comprises:

filtering a first frequency component subset among the frequency components of the first frequency comb and filtering a second frequency component subset among the frequency components of the second frequency comb, the first frequency component subset and the second frequency component subset located within a known frequency band in the source spectrum; and interfering the first frequency component subset and the second frequency component sunset to provide the isolated beating component subset.

21. The method as claimed in claim 20, wherein filtering the first frequency component subset and filtering the second frequency component subset comprise filtering the first frequency comb and the second frequency comb using a passive band-pass filter with the known frequency passband in the source spectrum to provide respectively the first frequency component subset and the second frequency component subset, the first frequency component subset and the second frequency component subset interfering to provide the reference beating component subset; and wherein said monitoring comprises detecting the reference beating component subset to provide a reference beating signal in the beating spectrum, and monitoring at least one of the phase and the frequency of the reference beating signal.

22. The method as claimed in claim 16, wherein said isolating at least one reference beating component subset comprises actively filtering a portion of the source spectrum of the frequency comb using an active filter with the known frequency passband in the source spectrum.

23. The method as claimed in claim 16, wherein the at least one reference beating component subset comprises a first reference beating component subset and a second reference beating component subset, and the at least one variable frequency comb parameter comprises a frequency offset parameter and a frequency scale parameter;

wherein said determining comprises computing correction parameters comprising an offset correction phase and a correction gain; and wherein said correcting the beating interference signal comprises subtracting the offset correction phase from the beating interference signal and resampling the beating interference signal on an equidistant phase grid using the correction gain.

24. The method as claimed in claim 16, further comprising outputting the corrected beating interference signal.

25. The method as claimed in claim 16, wherein the correction function is defined by at least one correction parameter and the method further comprises outputting the at least one correction parameter.

26. The method as claimed in claim 16, wherein generating a beating interference signal comprises generating a Fourier Transform Spectroscopy (FTS) interferogram and its corresponding spectrum.

27. The method as claimed in claim 16, further comprising analyzing the corrected sample interference signal according to at least one of Optical Low Coherence Reflectrometry (OLCR), Optical Coherence Reflectrometry (OCR) and Light Detection And Ranging (LIDAR).

* * * * *